United States Patent
Weh et al.

(10) Patent No.: US 10,625,722 B2
(45) Date of Patent: Apr. 21, 2020

(54) METHOD FOR CLAMPING AND FOR MACHINING A HYDRAULIC BLOCK OF A SLIP-CONTROLLED HYDRAULIC VEHICLE BRAKE SYSTEM, AND HYDRAULIC BLOCK

(71) Applicant: Robert Bosch GmbH, Stuttgart (DE)

(72) Inventors: Andreas Weh, Sulzberg (DE); Juergen Tandler, Fuessen (DE); Matthias Mayr, Rettenberg (DE); Thomas Geisenberger, Burgberg (DE); Wolfgang Frodl, Immenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 26 days.

(21) Appl. No.: 15/687,931

(22) Filed: Aug. 28, 2017

(65) Prior Publication Data
US 2018/0056955 A1    Mar. 1, 2018

(30) Foreign Application Priority Data
Aug. 30, 2016    (DE) .......................... 10 2016 216 344

(51) Int. Cl.
*B23Q 3/06*   (2006.01)
*B60T 8/36*   (2006.01)
*F15B 13/08*   (2006.01)
*F15B 13/044*   (2006.01)

(52) U.S. Cl.
CPC ................ *B60T 8/368* (2013.01); *B23Q 3/06* (2013.01); *F15B 13/0442* (2013.01); *F15B 13/0814* (2013.01); *F15B 13/0889* (2013.01); *F15B 13/0892* (2013.01)

(58) Field of Classification Search
CPC ........ B60T 8/368; B60T 8/3685; B60T 8/363; B60T 8/3675; B60T 17/02; B60T 13/686; B60T 13/165; Y10T 29/49998; B23P 25/00; B23Q 3/06; B23Q 3/062; B23Q 3/069
USPC ...... 29/890.124–890.13; 303/119.3, DIG. 10
See application file for complete search history.

(56) References Cited

U.S. PATENT DOCUMENTS

| | | | | |
|---|---|---|---|---|
| 6,688,707 | B1* | 2/2004 | Dinkel | B60T 8/368 303/119.3 |
| 2008/0298982 | A1* | 12/2008 | Pabst | B60T 8/368 417/273 |
| 2011/0074208 | A1* | 3/2011 | Song | B60T 8/4031 303/10 |
| 2013/0249156 | A1* | 9/2013 | Haruna | B23Q 1/009 269/32 |

(Continued)

FOREIGN PATENT DOCUMENTS

| | | | | |
|---|---|---|---|---|
| DE | | 10353888 A1 * | 6/2004 | .............. B60T 8/368 |
| DE | | 102006026872 A1 | 12/2007 | |

(Continued)

*Primary Examiner* — Bradley T King
*Assistant Examiner* — Stephen M Bowes
(74) *Attorney, Agent, or Firm* — Norton Rose Fulbright US LLP; Gerard Messina

(57) ABSTRACT

A method for producing a hydraulic block of a slip-controlled hydraulic non-muscular-energy vehicle brake system. For the milling operation, the hydraulic block is clamped in two setups and a pump bore, into which the hydraulic block is clamped in the second setup, is produced in the hydraulic block in the first setup, thereby making it possible to machine five sides of the hydraulic block in the second setup free of clamping arrangement. Also described is a related hydraulic block.

9 Claims, 3 Drawing Sheets

(56) References Cited

U.S. PATENT DOCUMENTS

| | | | | |
|---|---|---|---|---|
| 2013/0292893 A1* | 11/2013 | Yoshida | ................ | B23Q 3/062 |
| | | | | 269/134 |
| 2014/0062177 A1* | 3/2014 | Fellmeth | ................ | B60T 13/16 |
| | | | | 303/6.01 |
| 2015/0360658 A1* | 12/2015 | Reiner | ...................... | B60T 8/42 |
| | | | | 303/113.1 |

FOREIGN PATENT DOCUMENTS

| | | | | |
|---|---|---|---|---|
| JP | 2013112012 A | * | 6/2013 | ............. B60T 8/368 |
| WO | WO-2004048173 A2 | * | 6/2004 | ............. B60T 8/368 |
| WO | WO-2013077399 A1 | * | 5/2013 | |

* cited by examiner

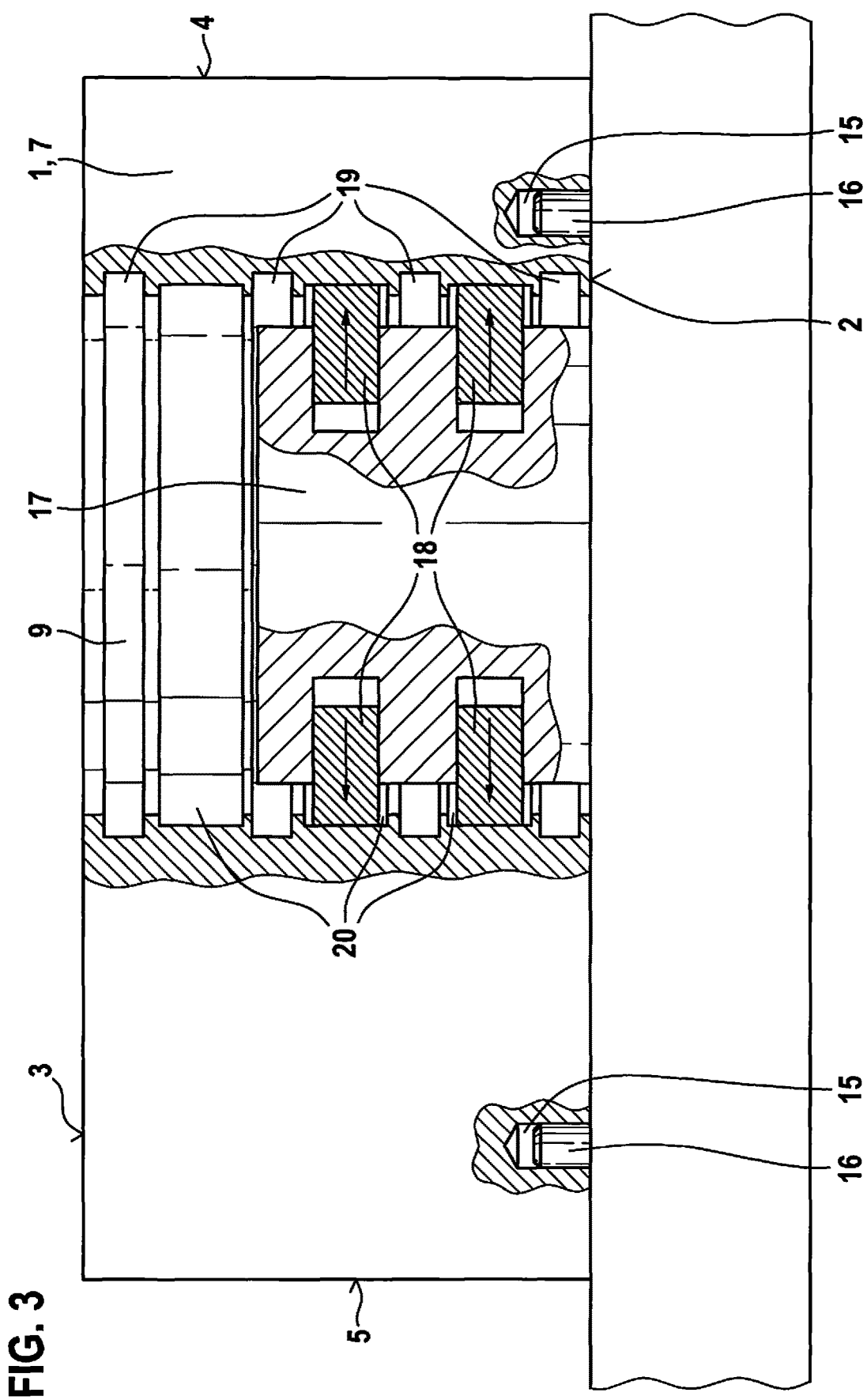

METHOD FOR CLAMPING AND FOR MACHINING A HYDRAULIC BLOCK OF A SLIP-CONTROLLED HYDRAULIC VEHICLE BRAKE SYSTEM, AND HYDRAULIC BLOCK

RELATED APPLICATION INFORMATION

The present application claims priority to and the benefit of German patent application no. 10 2016 216 344.2, which was filed in Germany on Aug. 30, 2016, the disclosure which is incorporated herein by reference.

FIELD OF THE INVENTION

The present invention relates to a method for clamping and machining a hydraulic block of a slip-controlled hydraulic vehicle brake system. In addition, the present invention relates to such a hydraulic block.

BACKGROUND INFORMATION

Slip controls, for example, are anti-lock control systems, traction control systems and/or driving dynamics controls/electronic stability programs, for which the abbreviations ABS, ASR and ESP are commonly used. Such slip controls of hydraulic vehicle brake systems for passenger cars and motorbikes are known and will not be discussed here in more detail.

The laid-open document DE 10 2006 026 872 A1 discusses a hydraulic block for a slip-controlled hydraulic vehicle brake system. The hydraulic block is a cuboidal block made of metal, which is used for the mechanical fastening and the hydraulic interconnection of hydraulic components of the slip control. An interconnection is a connection of the hydraulic components in accordance with a hydraulic wiring diagram of the slip control. Hydraulic components, for example, are hydro-pumps, solenoid valves, non-return valves, hydraulic accumulators, damping chambers, and pressure sensors. The hydraulic block is provided with receptacles for the hydraulic components, such receptacles typically being cylindrical counter-bores, often having a stepped diameter, blind holes or through holes, into which the hydraulic components are introduced and fastened by caulking in a pressure-tight manner.

The receptacles for the hydraulic components are connected to one another by way of bores in the hydraulic block. An electric motor for driving the hydro-pumps and an electronic control unit for controlling the hydraulic components are mounted on the outside of the hydraulic block. In addition, the hydraulic block has connections for a master brake cylinder and for wheel brakes. These, too, are typically cylindrical counter-bores having a stepped diameter, into which connection nipples of brake lines are pressed and then caulked in a pressure-tight manner. Fitted with the hydraulic components, the hydraulic block forms the core piece, or at least one core piece, of a slip control.

SUMMARY OF THE INVENTION

The subject matter of the present invention relates to a method for producing what may be a cuboidal hydraulic block of a slip-controlled hydraulic vehicle brake system. For example, the hydraulic block is cut off, for instance sawed off, from an extruded rod that has a rectangular cross-section and is made from aluminum or an aluminum-alloy, and is machined in two setups according to the present invention. A setup indicates a temporary fixation of the hydraulic block for and during the machining, using clamping arrangement such as clamping jaws, which are pressed against the hydraulic block and press the hydraulic block against other clamping arrangement or counter-bearings such as a machine table.

According to the present invention, in the first setup, the hydraulic block is clamped at three sides that adjoin one another at a corner against three opposite-lying sides. Of three sides adjoining one another at a corner, two sides have a common edge in each case, the edges meeting at the shared corner. Clamping arrangement such as clamping jaws press against the three sides of the hydraulic block adjoining one another at the corner and press the hydraulic block by its three opposite-lying sides against clamping arrangement, counter bearings or the like.

In the first setup, a pump bore is produced in a first side of the hydraulic block by machining, in particular by drilling and/or milling. In this context, "bore" means a through hole or a blind hole which may have a circular cross-section, regardless of the way in which the hole is produced. Thus, a bore need not necessarily be created by drilling but can also be produced by milling, for example. The pump bore may be a blind hole or a through hole. The pump bore serves as a receptacle of a cylinder in which a piston, referred to as plunger piston, is axially displaceable. The plunger piston is displaced electromechanically using an electric motor via a mechanical gear. The plunger piston in the cylinder is used to build up a brake pressure, and the hydraulic block produced according to the present invention in particular is provided for a slip-controlled, non-muscular-energy vehicle brake system.

Moreover, in the first setup, additional bores and counter-bores are produced in different sides of the hydraulic block as receptacles for hydraulic components, among other things.

A master-brake cylinder bore is produced in the hydraulic block by machining, which may also be in the first setup. The master-brake cylinder bore may be a through hole that extends perpendicular to the pump bore without intersecting it. It is used as a receptacle of a master-brake cylinder in the hydraulic block.

In one or in both setup(s), one or more side(s) of the hydraulic block is/are able to be face-milled as reference areas, in particular milled in a planar fashion.

In the second setup, the hydraulic block is clamped against the first side, or against a second side lying opposite from the first side, in the pump bore. The pump bore is produced in the first side. If the pump bore is produced in the form of a through hole, it terminates in the second side lying opposite from the first side. The clamping in the pump bore offers the advantage that all sides of the hydraulic block, with the exception of the first side or the opposite-lying second side against which the hydraulic block is clamped, are freely accessible to processing across their entire surfaces. Clamping may take place at points of the pump bore where no demands are made on the surface quality and where impressions left by clamping arrangement (so-called clamping marks) are of no consequence. Thus, for example, clamping does not take place in circumferential sealing grooves into which sealing rings are meant to be placed.

All bores and all cuts that have not been produced in the first setup are realized in the second setup. Oblique bores may also be produced in the second setup. Oblique bores extend at an angle other than a right angle in relation to at least one side of the hydraulic block.

The further descriptions herein have as their subject matter advantageous refinements and further developments of the inventions described herein.

Further descriptions herein (claim 3) provide for one or more positioning bore(s) (index bores) at which the hydraulic block is aligned in the second setup. The positioning bores are produced, in particular in the first setup, in the first or the second side of the hydraulic block, against which the hydraulic block is clamped in the second setup.

Further descriptions herein (claim 4) provide for small clamping arrangement. "Small" refers to a clamping area on the sides of the hydraulic block that is covered by the clamping arrangement. A size of the clamping areas covered by the clamping arrangement lies in a range of one or fewer percent, or a few percent, of the area of the respective side of the hydraulic block. This allows the sides of the hydraulic block to be processed over a large portion of their surfaces.

In addition, the present invention relates to a hydraulic block for a slip-controlled hydraulic, in particular a non-muscular-energy vehicle brake system, in which a brake pressure in a cylinder is built up with the aid of non-muscular energy, such as by an electric motor, via a mechanical gear unit having a piston, which may also be referred to as a plunger piston. The hydraulic block according to the present invention having the features of the further descriptions herein (claim 10) includes a pump bore for the cylinder of the plunger piston, which may penetrate the hydraulic block, i.e. is open on two opposite-lying sides of the hydraulic block. More specifically, a cylinder disposed in the pump bore projects from the hydraulic block on one side and may therefore be axially longer than the hydraulic block is thick in the axial direction of the pump bore. The pump bore has at least one circumferential recess and/or circumferential groove carrying brake fluid, into which one or more bore(s) of the hydraulic block terminate(s) for the supply or discharge of brake fluid. The circumferential recess and/or the circumferential brake-fluid-carrying groove ensure(s) that, regardless of an angular position of a cylinder disposed inside the pump bore, an interior space of the cylinder communicates with the bore(s) of the hydraulic block that terminate(s) in the circumferential recess and/or circumferential groove carrying brake fluid, such a communication taking place via a hole in a circumferential wall of the cylinder and via the circumferential recess and/or the circumferential brake-fluid-carrying groove. To machine the hydraulic block, the hydraulic block is clamped in a groove that is not a sealing groove provided to accommodate a sealing ring. This allows for the reliable clamping of the hydraulic block without the risk of damaging sealing areas of the pump bore by the machining. Sealing areas are surfaces or surface regions of the pump bore against which a sealing ring rests that seals a cylinder situated inside the pump bore. Such sealing areas are sidewalls of grooves and a groove base of sealing grooves, in particular.

According to the further descriptions herein (claim 13), the hydraulic block has one or more oblique bore(s) of the type described earlier. According to a development of the present invention, for an auxiliary braking operation in the event that the non-muscular-energy force is not available, the hydraulic block includes a master brake cylinder bore for a master brake cylinder for generating a brake pressure using muscular force or auxiliary energy (claim 12). The energy-assisted braking operation is to be distinguished from the auxiliary braking operation: The auxiliary braking operation is a braking operation in the event of a failure of the non-muscular force, and the energy-assisted braking operation is a braking operating using muscular force aided by a brake booster, for example.

The present invention will be discussed in greater detail in the following text with the aid of a specific embodiment shown in the drawings.

BRIEF DESCRIPTION OF THE DRAWINGS

FIG. 3 shows a side view of the hydraulic block from FIGS. 1 and 2, in a part-sectional view.

DETAILED DESCRIPTION

Figure 1:
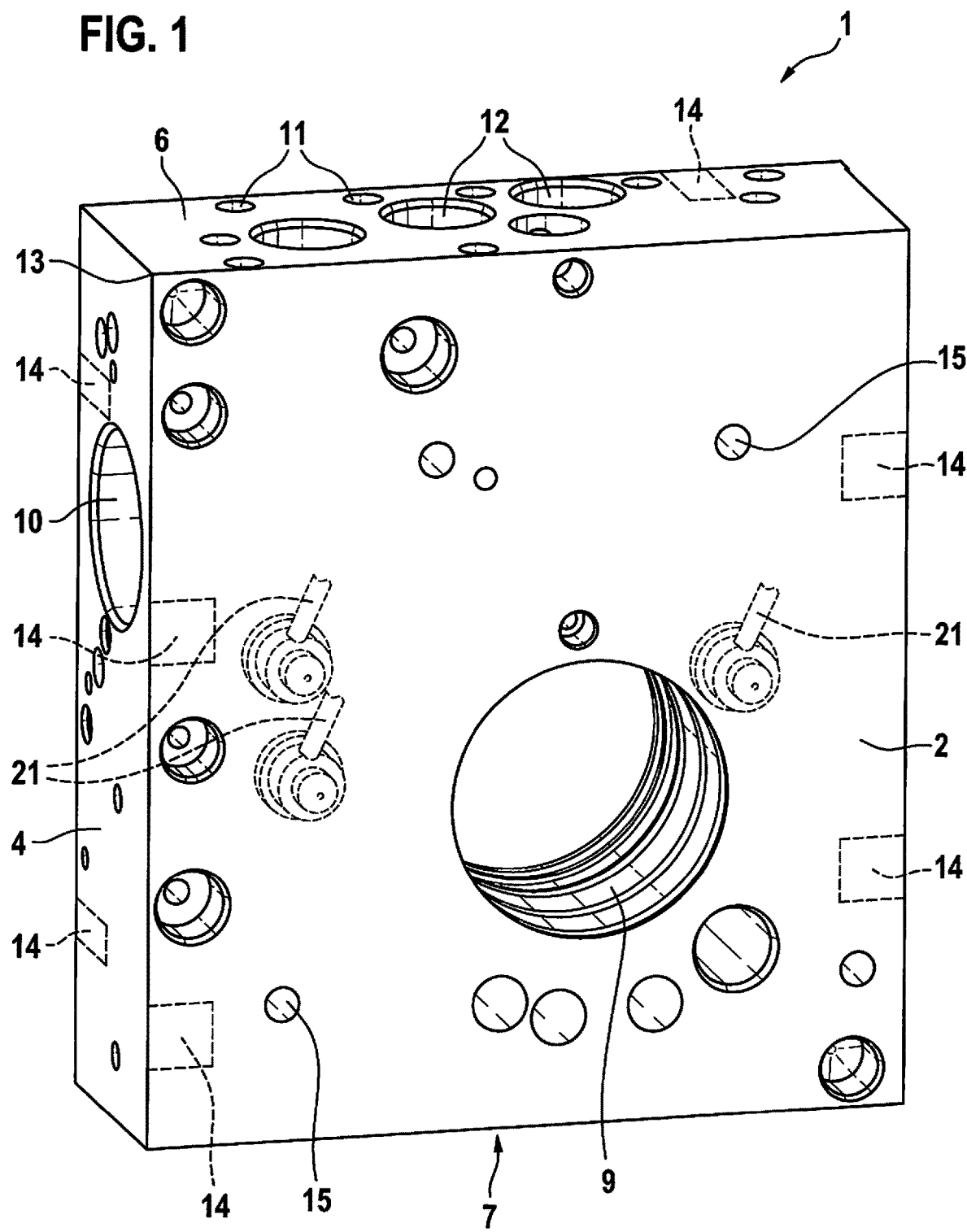
FIG. 1 shows a hydraulic block of a slip control of a hydraulic vehicle brake system in a perspective representation in a view directed toward an engine side.
Figure 2:
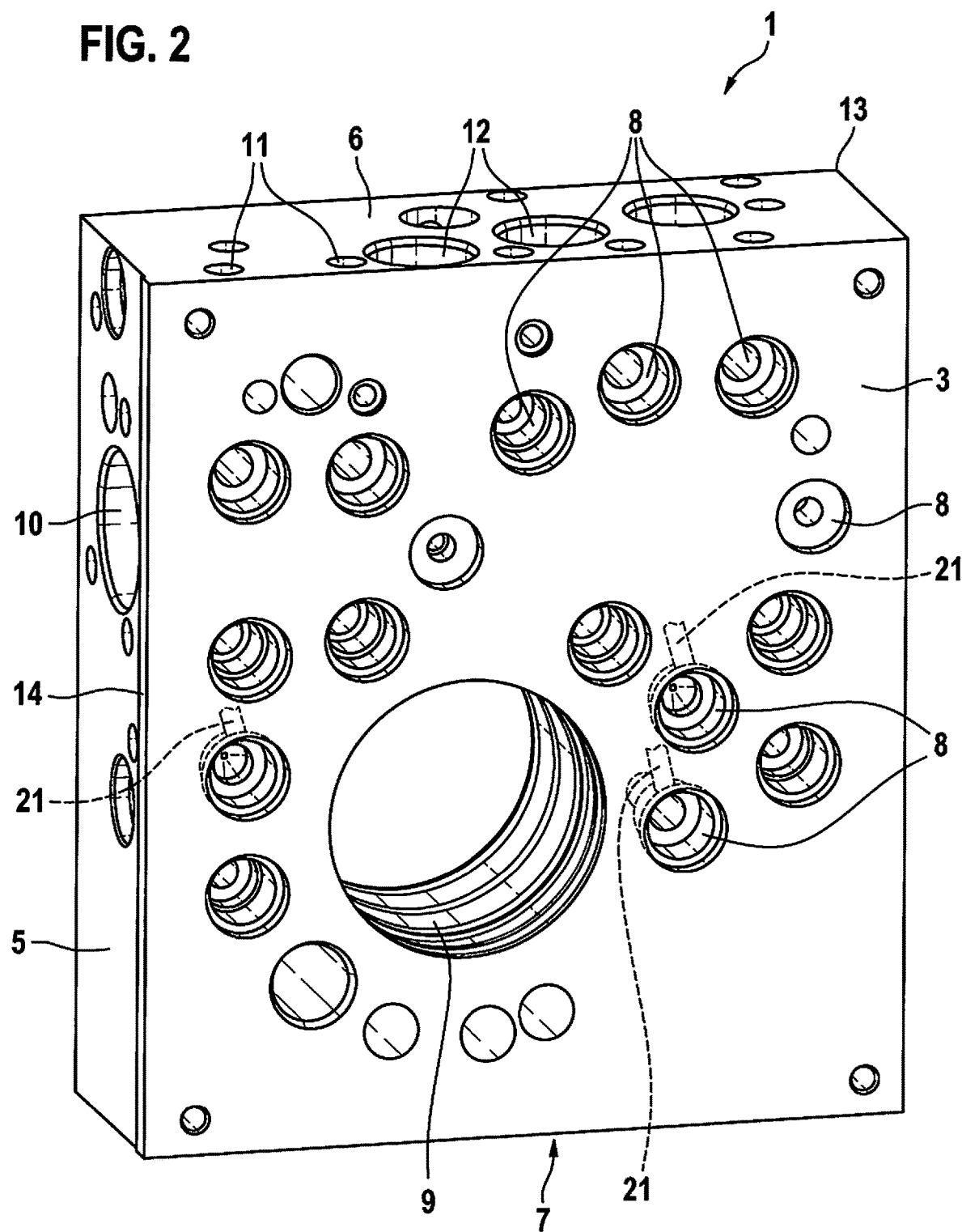
FIG. 2 shows the hydraulic block from FIG. 1 in a perspective view directed toward a control-unit side lying opposite from the engine side.

Hydraulic block 1 according to the present invention and shown in FIGS. 1 and 2 is provided for a hydraulic unit of a slip control of a hydraulic vehicle brake system that is not otherwise shown. Such slip controls, for example, are anti-lock braking systems, traction controls and/or driving dynamics controls/electronic stability programs, for which the abbreviations ABS, ASR and ESP are commonly used.

Hydraulic block 1 is a cuboidal metal block, which is longer than broad and broader than thick. It has a rectangular base side, which is referred to here as first side or engine side 2, a congruent cover side lying opposite from the base side, which is referred to here as second side or control-unit side 3; it also has two longitudinal sides, which are also referred to here as third and fourth sides 4, 5, respectively, and two transverse side, which are also referred to here as fifth and sixth sides 6, 7, respectively. Hydraulic block 1 is extruded from aluminum or an aluminum alloy and cut into pieces by sawing. Sawing surfaces are the two longitudinal sides 4, 5.

Hydraulic block 1 has receptacles 8 for solenoid valves and pressure sensors, a pump bore 9 for a cylinder of a piston pump, a master-brake cylinder bore 10, connections 11 for wheel brakes, and connections 12 for a brake-fluid reservoir, which are machined by drilling and/or milling and are connected to one another by bores in hydraulic block 1 in accordance with a hydraulic wiring diagram of the slip control. Receptacles 8 and connections 11, 12 are cylindrical counter-bores in sides 2 through 7 of hydraulic block 1, into which the solenoid valves and pressure sensors as well as connection nipples of brake lines are pressed and caulked so as to provide pressure-tightness (self-clinch). The connection nipples are possibly also screw-fitted. In particular, a "bore" is to be understood as a cylindrical, possibly also diameter-stepped through hole or blind hole in hydraulic block 1. The bore is independent of its production, i.e. need not necessarily be drilled but may also be created in some other manner such as by milling. The solenoid valves and pressure sensors may in general also be understood as hydraulic components of the slip control. Hydraulic block 1 is drilled in the Cartesian manner, or in other words, bores and cuts are made in parallel with and/or at a right angles to sides 2 through 7 in hydraulic block 1. Hydraulic block 1 is provided for a hydraulic, slip-controlled non-muscular-energy vehicle brake system in which a brake pressure is generated by non-muscular force using what is known as a plunger piston, which is accommodated, in an axially displaceable manner, inside the cylinder that is situated in pump bore 9.

Hydraulic block 1 is machined in two setups. Clamping or setting up indicates a fixation of hydraulic block 1 for the machining by drilling and/or milling. In the first setup, hydraulic block 1 is clamped on three sides 3, 4, 6 that abut one another at a corner 13, against three opposite-lying sides 2, 5, 7. The three sides 3, 4, 6 on which clamping takes place and the three opposite-lying sides 2, 5, 7 against which the clamping is implemented, abut edges of hydraulic block 1 in a pairwise manner in each case. In the exemplary embodiment, the three sides 3, 4, 6 on which clamping is carried out are control-unit side 3, a first longitudinal side 4, and a first transverse side 6, while the three opposite-lying sides 2, 5, 7, against which the clamping takes place, are engine side 2, a second longitudinal side 5, and a second transverse side 7 of hydraulic block 1.

Clamping arrangement for clamping hydraulic block 1, for example, are clamping jaws (not shown), which are small in comparison with areas of sides 2 through 7, so that they cover only small clamping areas 14 on sides 2 through 7 of hydraulic block 1 during the clamping. Outside of the clamping arrangement, clamped hydraulics block 1 or its sides 2 through 7 is/are able to be processed by machining. Clamping areas 14 are no larger than one percent or a few percent of the areas of sides 2 through 7 of hydraulic block 1. The clamping arrangement on control-unit side 3, first longitudinal side 4, and first transverse side 6 are mobile, and the clamping arrangement on the opposite sides, i.e. engine side 2, second longitudinal side 5, and second transverse side 7, may be fixed in place or may likewise be mobile. "Clamping against the opposite-lying sides 2, 5, 7" means that hydraulic block 1 is clamped by opposite sides 2, 5, 7 against the clamping arrangement situated there.

In the first setup, pump bore 9 is produced from engine side 2 straight through to opposite-lying control-unit side 3, and master-brake cylinder bore 10 is machined by drilling and/or milling. Master-brake cylinder bore 10 extends at a right angle to pump bore 9, without interruption, from one to the other respective longitudinal side 4, 5, and at a right angle to longitudinal sides 4, 5 past pump bore 9 without intersecting pump bore 9. Master-brake cylinder bore 10 is able to be produced or machined from one or from both longitudinal side(s) 4, 5. In addition, in the first setup, all bores, counter-bores, receptacles 8, connections 11, 12 etc. that are situated on engine side 2 or on one of the two longitudinal sides 4, 5, terminate on one of these sides 2, 4, 5 or are able to be produced from the direction of one of these sides 2, 4, 5, are drilled and/or cut. Moreover, a portion of the bores, counter-bores, receptacles 8, and connections 11, 12 are produced in first transverse side 6 of hydraulic block 1. In the first setup of hydraulic block 1, second longitudinal side 5 is also face-milled, and two index bores 15 are drilled into engine side 2. Index bores 15 are blind holes for an exact positioning of hydraulic block 1 in the second setup. In the exemplary embodiment, they are disposed diametrically opposite each other in relation to pump bore 9, in engine side 2 of hydraulic block 1. A narrow strip of longitudinal side 5 that abuts control-unit side 2 is not processed when second longitudinal side 5 is face-milled because it is used as a clamping area 14 for the first setup.

Following the milling in the first setup, hydraulic block 1 is unclamped and for the second setup, is clamped in pump bore 9 against control-unit side 2, which is also referred to as second side 2 of hydraulic block 1 (FIG. 3). In so doing, hydraulic block 1 is aligned with the aid of pins 16, which accurately fit and project into index bores 15. A clamping cylinder 17, which projects into pump bore 9 of hydraulic block 1 and includes clamping jaws 18 as clamping arrangement that may be extended outwardly toward the side, is used for the clamping. Pump bore 9 has circumferential sealing grooves 19 for sealing rings (not shown) that seal the cylinder of the piston pump, their surfaces forming sealing areas for a sealing contact of a sealing ring that must not be damaged by the clamping. The cylinder accommodates the plunger piston, which is axially displaceable in the cylinder in order to generate a brake pressure, the displacement being implemented electromechanically by non-muscular force using an electric motor and a mechanical gear unit. Clamping jaws 18 therefore engage with pump bore 9 outside sealing grooves 19.

In addition to sealing grooves 19 for the sealing rings, pump bore 9 is provided with recesses and/or brake-fluid-carrying grooves 20 extending in the circumferential direction, into which bores for the supply and discharge of brake fluid terminate. These grooves 20 carry brake fluid when hydraulic block 1, fitted with the hydraulic components, is connected to a hydraulic vehicle brake system and the vehicle brake system including component-fitted hydraulic block 1 is evacuated and filled with brake fluid. These recesses and/or brake-fluid-carrying grooves 20 are used for routing brake fluid from one or more bore(s) that terminate in the recess and/or brake-fluid-carrying groove 20 across an entire circumference around a cylinder for the plunger piston accommodated in pump bore 9. This allows the brake fluid to enter the cylinder from the recess and/or the brake-fluid-carrying groove 20 through a hole in a circumferential wall of the cylinder, or vice versa. Through the recess and/or the brake-fluid-carrying groove 20, an interior space of a cylinder for the plunger piston accommodated in pump bore 9 of hydraulic block 1 always communicates, by way of a hole in a circumferential wall of the cylinder, with a bore that terminates in the recess and/or in the brake-fluid-carrying groove 20, regardless of an angular position of the cylinder. It is therefore not necessary to align the cylinder at the correct angle when introducing the cylinder into pump bore 9.

Clamping jaws 19 of clamping cylinder 17 engage with these recesses and/or brake-fluid-carrying grooves 20 or with circumferential areas of pump bore 9 between sealing grooves 19 and/or the recesses and/or brake-fluid-carrying grooves 20. No quality-related demands are made on surfaces of these recesses or brake-fluid-carrying grooves 20 and the circumferential surfaces of pump bore 9 outside sealing grooves 19, which means that impressions (clamping marks) of clamping jaws 18 do not interfere here. Sealing rings in sealing grooves 19 provide sealing between a cylinder for a plunger piston disposed in pump bore 9 of hydraulic block 1 and the outside and sealing with regard to different pressure levels between the recesses and/or brake-fluid-carrying grooves 20. To prevent damage to sealing surfaces, hydraulic block 1 is not clamped into sealing grooves 19.

In the second setup, all remaining bores, counter-bores, receptacles 8, and connections 11, 12 etc. are drilled and/or milled or created in hydraulic block 1. Oblique bores 21 are also produced in the second setup. These are bores in hydraulic block 1, used as conduits for brake fluid, that do not run in the Cartesian manner, i.e., do not at a right angle but rather run obliquely with respect to at least one of sides 2 through 7 or edges of hydraulic block 1. Oblique bores 21 serve as a connection of bores in different planes of hydraulic block 1, i.e. a connection of bores with different clearances from sides 2 through 7 of hydraulic block 1, or for the connection of receptacles 8 for hydraulic components and/or connections 11, 12 to one another and/or to other bores in hydraulic block 1, especially when drilling at a right angle and/or parallel to sides 2 through 7 of hydraulic block 1 is impossible, difficult or involves a lot of work. To produce oblique bores 21, hydraulic block 1 is pivoted about an imaginary transverse axis according to an angle of oblique bores 21, the imaginary transverse axis extending perpendicular to longitudinal sides 4, 5. In the second setup, control-unit side 3 is face-milled as well. No clamping arrangement are situated on control-unit side 3 in the second setup because hydraulic block 1 is clamped against engine side 2 in pump bore 9. Control-unit side 2 is free across its entire surface, so that its full surface is able to be face-milled.

An axis of a working spindle during the machining and milling is fixed, and hydraulic block 1 in its two setups is moved translationally and rotationally for producing oblique bores 21, in such a way that the respectively to be produced counter-bore or bore is coaxial with respect to the axis of the working spindle.

After the machining of hydraulic block 1 in the first and the second setup, hydraulic block 1 is unclamped and is ready to be fitted with a master brake cylinder and its pistons, the cylinder with the plunger piston in pump bore 9 for the non-muscular-energy braking operation, and with all other hydraulic components such as solenoid valves and pressure sensors. In addition, an electric motor having a mechanical gear unit for displacing the plunger piston in the cylinder is mounted on engine side 2 and an electronic control unit is mounted on control-unit side 3.

What is claimed is:

1. A hydraulic block for a slip-controlled hydraulic vehicle brake system, comprising:
    a cuboidal metal block;
    a pump bore situated in the cuboidal metal block, the pump bore configured to accommodate a cylinder of a piston pump;
    wherein the pump bore has at least one sealing groove, each of the at least one sealing groove being configured to receive a sealing ring which hydraulically seals the cylinder of the piston pump when the cylinder of the piston pump is installed in the pump bore;
    wherein the pump bore has at least one circumferential groove, each of the at least one circumferential groove extending across an entire circumference of the pump bore, each of the at least one circumferential groove being separated from the at least one sealing groove and being configured to carry brake fluid around an outer circumference of the cylinder of the piston pump when the cylinder of the piston pump is installed in the pump bore;
    wherein each of the at least one circumferential groove of the pump bore is further configured to receive a clamping jaw which extends from a clamping cylinder, the clamping jaw engaging with the at least one circumferential groove when the clamping cylinder is inserted in the pump bore during machining of the cuboidal metal block;
    wherein the at least one circumferential groove includes at least two circumferential grooves separated from each other; and
    wherein the hydraulic block further comprises:
        the clamping cylinder situated in the pump bore; and
        the clamping jaw engaged in the at least one circumferential groove.

2. The hydraulic block as recited in claim 1, further comprising:
    the sealing ring situated in each of the at least one sealing groove.

3. The hydraulic block as recited in claim 1, wherein the at least one sealing groove includes at least two sealing grooves separated from each other.

4. The hydraulic block of claim 3, wherein the cuboidal metal block has at least one oblique bore that does not extend parallel to at least one side of the cuboidal metal block and does not extend at a right angle with respect to the at least one side of the cuboidal metal block.

5. The hydraulic block of claim 3, further comprising:
    a master-brake cylinder bore situated in the cuboidal metal block.

6. The hydraulic block as recited in claim 3,
    wherein a respective sealing ring is situated in each of the at least two sealing grooves.

7. The hydraulic block of claim 3, wherein the pump bore terminates on an engine side of the cuboidal metal block provided for mounting an electric motor for driving a piston of the piston pump whose piston is accommodated in the cylinder of the piston pump.

8. The hydraulic block of claim 7, wherein the pump bore extends to a control-unit side of the cuboidal metal block lying opposite from the engine side, which is provided for the mounting of solenoid valves and/or an electronic control unit of a slip control of a hydraulic vehicle brake system.

9. A hydraulic block for a slip-controlled hydraulic vehicle brake system, comprising:
    a cuboidal metal block;
    a pump bore situated in the cuboidal metal block, the pump bore configured to accommodate a cylinder of a piston pump;
    wherein the pump bore has at least one sealing groove, each of the at least one sealing groove being configured to receive a sealing ring which hydraulically seals the cylinder of the piston pump when the cylinder of the piston pump is installed in the pump bore;
        wherein the pump bore has at least one circumferential groove, each of the at least one circumferential groove extending across an entire circumference of the pump bore, each of the at least one circumferential groove being separated from the at least one sealing groove and being configured to carry brake fluid around an outer circumference of the cylinder of the piston pump when the cylinder of the piston pump is installed in the pump bore;
        wherein each of the at least one circumferential groove of the pump bore is further configured to receive a clamping jaw which extends from a clamping cylinder, the clamping jaw engaging with the at least one circumferential groove when the clamping cylinder is inserted in the pump bore during machining of the cuboidal metal block;
    wherein the at least one circumferential groove includes at least two circumferential grooves separated from each other;
    wherein the at least one sealing groove includes at least two sealing grooves separated from each other; and
    wherein the hydraulic block further comprises:
        the clamping cylinder situated in the pump bore;
        a respective clamping jaw of the clamping cylinder engaged in each of the at least two circumferential grooves, each of the respective clamping jaws extending from the clamping cylinder.

* * * * *